US006614390B2

(12) United States Patent
Steinbuch

(10) Patent No.: US 6,614,390 B2
(45) Date of Patent: Sep. 2, 2003

(54) METHOD FOR GENERATING AND ANALYZING RADAR PULSES AS WELL AS A RADAR SENSOR

(75) Inventor: Dirk Steinbuch, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/108,944

(22) Filed: Mar. 28, 2002

(65) Prior Publication Data

US 2002/0163465 A1 Nov. 7, 2002

(30) Foreign Application Priority Data

Mar. 31, 2001 (DE) .......................... 101 16 188

(51) Int. Cl.⁷ .............................. G01S 13/08
(52) U.S. Cl. .................. 342/70; 342/104; 342/194; 342/195; 342/118; 342/145
(58) Field of Search ............................ 342/70, 72, 104, 342/109, 130, 131, 134, 194, 195, 118

(56) References Cited

U.S. PATENT DOCUMENTS

| 3,939,341 | A | * | 2/1976 | Graves ....................... 359/191 |
| 4,065,768 | A | * | 12/1977 | Kondoh et al. ................ 342/61 |
| 4,103,301 | A | * | 7/1978 | Evans ......................... 342/93 |
| 5,115,242 | A | * | 5/1992 | Nagamune et al. ............ 342/124 |
| 5,469,167 | A | * | 11/1995 | Polge et al. ................... 342/25 |
| 5,963,163 | A | * | 10/1999 | Kemkemian et al. ........... 342/109 |
| 6,067,040 | A |   | 5/2000 | Puglia |
| 6,087,972 | A | * | 7/2000 | Puglia et al. ................. 342/28 |
| 6,362,777 | B1 | * | 3/2002 | Kawakami et al. ........... 342/131 |

FOREIGN PATENT DOCUMENTS

| DE | 199 26 787 | 1/2001 |
| EP | 0 685 930 | 12/1995 |

OTHER PUBLICATIONS

Heinz J. Siweris et al., Low–cost GaAs pHEMT MMIC' for millimeter–wave sensor applications, Microwave Theory and Techniques, IEEE Transactions on , vol: 46 Issue: 12 , Dec. 1998, pp: 2560–2567.*
G. Prescott et al., MMIC–based FM–CW radar for multi-polarization backscatter measurements, Geoscience and Remote Sensing Symposium, 1995, 'Quantitative Remote Sensing for Science and Applications', International , vol: 3, pp: 2273–2275.*
Villemazet et al. , MMIC couble–balanced mixer, Villemazet et al. , Nov. 29, 2001, patent application Publication U.S.–2001/0046849 A1.*

* cited by examiner

Primary Examiner—Thomas H. Tarcza
Assistant Examiner—Isam Alsomiri
(74) Attorney, Agent, or Firm—Kenyon & Kenyon

(57) ABSTRACT

A continuous signal of a radio frequency source is connected to an antenna using at least one mixer to generate and analyze radar pulses. To generate a radar pulse, the at least one mixer is briefly placed into a state of low throughput loss. After the radar pulse is generated and transmitted, the at least one mixer is switched over to a receive mode to analyze a mixed signal formed by a receive signal, in particular at least one radar pulse reflected by an object, and the continuous signal of the radio frequency source.

18 Claims, 2 Drawing Sheets

METHOD FOR GENERATING AND ANALYZING RADAR PULSES AS WELL AS A RADAR SENSOR

FIELD OF THE INVENTION

The present invention relates to a method for generating and analyzing radar pulses, in particular for short-range pulse radar applications in motor vehicles.

BACKGROUND INFORMATION

In automotive engineering, radar sensors are used to measure the distance to objects and/or the relative speed of such objects outside the motor vehicle. Objects may include, for example, motor vehicles driving ahead or parked motor vehicles, pedestrians, cyclists, or installations in the vicinity of the motor vehicle.

FIG. 1 shows a schematic representation of a radar device with the correlation receiver of the related art. A transmitter 300 is induced by a pulse generator 302 to emit a transmit signal 306 via an antenna 304. Transmit signal 306 strikes a target object 308, where it is reflected. Receive signal 310 is received by antenna 312. This antenna 312 may be identical to antenna 304. After receive signal 310 is received via antenna 312, it is transmitted to receiver 314 and is subsequently supplied to a signal analyzer 318 via a unit 316 having a lowpass and an analog/digital converter. The characteristic feature of a correlation receiver is that receiver 314 receives a reference signal 320 from pulse generator 302. Receive signals 310 received by receiver 314 are mixed with reference signal 320 in receiver 314. By correlation, it is possible to infer, for example, the distance to a target object on the basis of the time delay between transmission and reception of the radar pulses.

A similar radar device is described in German Published Patent Application No. 199 26 787. A transmission switch is switched on and off by the pulses of a generator so that during the pulse duration, a radio frequency wave generated by an oscillator and guided to the transmission switch via a branching is switched through to the transmitting antenna. A receiving component also receives the output signal of the generator. The receive signal, i.e., a radar pulse reflected by an object, is mixed with the oscillator signal which reaches a mixer via a receive switch during a pre-set time. U.S. Pat. No. 6,067,040 also operates with a transmission switch that is switched on and off by pulses of a generator. For the reception of the reflected radar pulses, separate channels for 1 and Q signals are provided. In this case also, the receive signal is mixed and analyzed only during a pre-set time.

SUMMARY OF THE INVENTION

The measures of the present invention make it possible to detect objects reliably. In contrast to the devices and methods known heretofore, noise problems play only a minor role. In addition, some RF components such as radio frequency switches are eliminated, permitting a simpler, less costly and consequently more cost-effective implementation of a radar sensor.

The present invention makes a radar concept possible which shifts to the LF or IF side the required rapid switching in the range of several hundred ps to detect objects in the vicinity of a motor vehicle, the switching occurring on the RF side in conventional SRR (short range radar). It is possible to combine the mixing and switching function in one component.

The concept according to the present invention requires only one antenna, which is used to transmit and receive radar pulses simultaneously. This essentially reduces the sensor size. In the method according to the present invention, a continuous signal of a radio frequency source may be connected with an antenna via at least one mixer. To generate a radar pulse, the mixer is briefly brought into a state of low throughput loss. The signal of the radio frequency source is then able to pass the mixer and reaches the antenna. Immediately after the radar pulse is generated and transmitted, the mixer is switched over to receive mode and awaits the return of the transmitted radar pulse which is reflected by an object. The delay time is a measure of the distance of the object. Upon receiving the radar pulse, the mixer, together with the continuous signal of the radio frequency source, generates an LF or IF pulse representing the envelope of the RF pulse and is capable of being analyzed.

With the present invention, it is possible to increase the detection range of a radar sensor at a working frequency of 24.125 Ghz to as much as 100 meters since the receive signals of the objects to be detected are not lost in noise as a function of the object characteristics as is ordinarily the case. This makes it possible to detect objects reliably.

In order to attain I/Q capability of the radar, two mixers may be interconnected for the inphase (I)-IF signal and the quadrature (Q)-IF signal.

The mixer or mixers may be placed into the state of low throughput loss, so that the intermediate frequency output of the mixer or mixers is connected to a power source. The resulting mixed signal—IF output signal of the mixer—may be amplified and sampled at a high bandwidth.

The mixed signal may be amplified and scanned separately for the I and Q IF signal.

To sample the mixed signal, a very short sampling pulse may be applied to a broadband sampler, the time of which corresponds to a selected distance cell.

DETAILED DESCRIPTION

Figure 1:
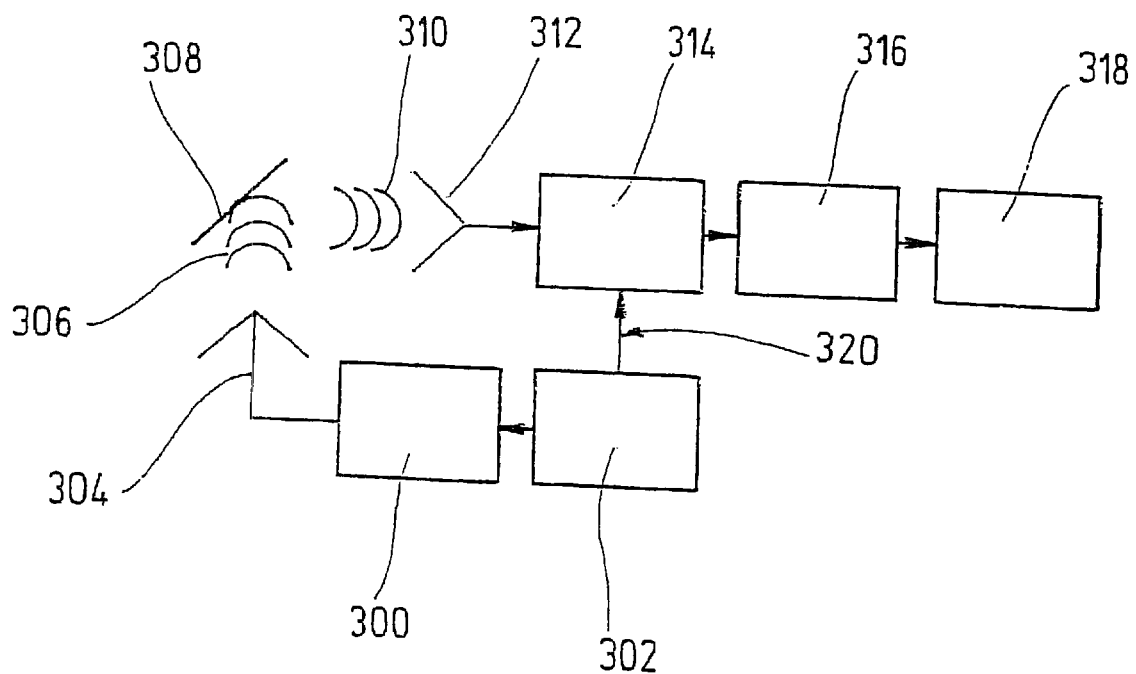
FIG. 1 is a schematic representation illustrating a radar device with a correlation receiver.
Figure 2:
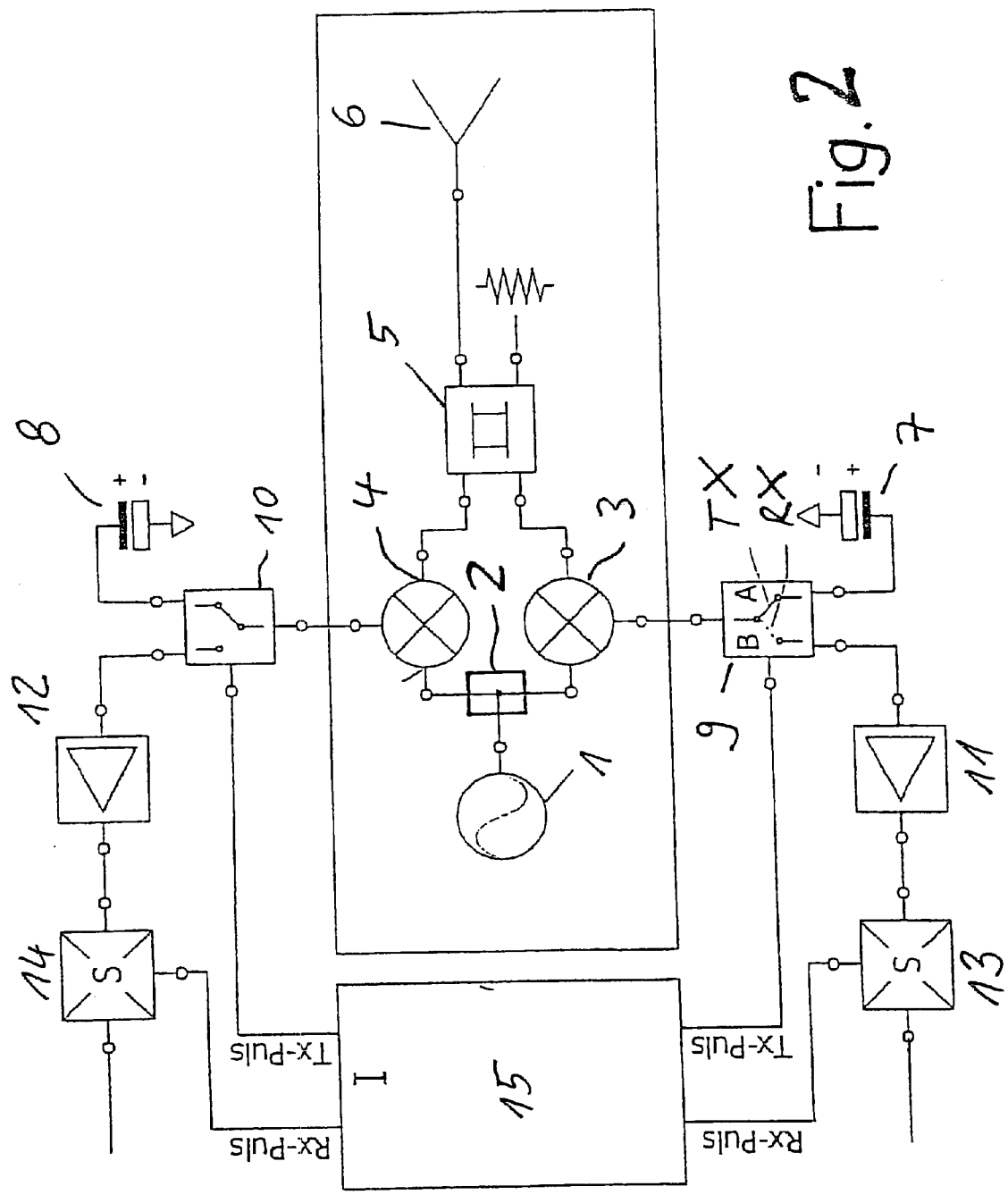
FIG. 2 is a diagram illustrating an exemplary radar sensor according to the present invention.

The radar sensor according to the present invention shown in FIG. 2 has a radio frequency source 1 which delivers a continuous radio frequency signal (CW signal). Via a branching circuit 2, this radio frequency signal reaches the inputs of two mixers 3 and 4. The outputs of these mixers are connected to antenna 6 via a power divider 5, e.g., a 3 dB power divider. In this exemplary embodiment, two mixers 3 and 4 are provided to attain an I/Q capability of the radar sensor. If it is intended to forgo the I/Q capability, one mixer is sufficient. Of course, units 2 and 5 are then also unnecessary. Mixers 3 and 4 are, for example, implemented as balanced mixers in the form of a rat-race hybrid (see in particular in this regard European Published Patent Application No. 0 685 930, which describes the design of such a rat-race hybrid). The entire RF part of the radar sensor is outlined in FIG. 2.

The isolation of the mixer or the mixers from the signal output of radio frequency source 1 to the mixer output in transmit direction or to the receive pulse input in receive direction typically amounts to 20 to 26 dB. The feed of a direct current into the intermediate frequency (IF) output of mixer 3 or 4 may bring the isolation to a typical level of 2 to 3 dB. If this current is applied, for example, for 1 ns, an RF pulse of a width of 1 ns is generated and transmitted. The on/off ratio turns out to be approximately 20 dB. Immediately after the current is applied by power source 7 or 8 via switch 9 or 10 in the shown switch position A (transmit mode), a switch is made from power source 6 or 7 (switchover into switch position B—receive mode) to a broadband amplifier 11 or 12 and a receive pulse reflected by an object is awaited, which is received via the same antenna 6. If a reflected radar pulse from antenna 6 reaches mixer 3 or 4 via power divider 5, the envelope of the receive pulse (IF signal) is formed from the continuous signal of radio frequency source 1 and the reflected radar pulse. This mixed signal/envelop is amplified by broadband IF amplifier 11 or 12 of a bandwidth of, for example, 1 MHz to 1 GHz and supplied to receive scanner 13 or 14. This takes place separately for the I and the Q channel (separate receive and analysis channels for the I and Q receive signal). Mixer 3 and possibly also mixer 4 must have a IF bandwidth of 1 Ghz in order not to widen the reflected radar pulse and thus to lose object resolution.

To be able to compare the delay time of the received radar pulse and to obtain distance information from it, a delay circuit identical to the one of the SRR (short-range radar) is required. After a defined time after the generation of the transmit pulse, which corresponds to the pulse delay for the desired distance cell, a very short scanning pulse is applied to a broadband scanner 13 or 14 and it scans the output signal of IF amplifier 11 or 12 in the selected distance cell. The length of the scan pulse is of the order of magnitude of the transmit pulse width and the IF pulse width. This takes place at the rate of generation of the transmit pulses, only it is delayed accordingly. The variation of the delay time allows the desired distance range to be scanned in a manner identical to SSR. The scanner detects voltages differing from zero and thus recognizes the pulse return after the desired delay. Non-coherent pulse integration is possible, which improves the signal-to-noise ratio in proportion to SQRT(n), n being the number of the integrated pulses. The processing of the scan pulses for scanners 13 and 14 and the control pulses for switches 9 and 10 is performed by control unit 15, which also provides the corresponding delay times for the switchover of switches 9 and 10 and the generation of the scan pulses.

The architecture of the radar sensor of the present invention results in the following additional advantages: The fact that the signal of radio frequency source 1 is continuously present as a CW signal at mixer 3 or 4 and is not pulsed as in SRR, brings about a substantial improvement of the noise factor and accordingly the possibility to effectively expand the detection range.

At 20 dB, the obviously attainable interference Doppler suppression, which corresponds to the on/off ratio of mixer 3 or 4, is very poor. This is, however, inconsequential since the generated mixed signal represented by the envelope of the RF receive pulse is amplified by an amplifier with a lower cutoff frequency of several megahertz. Interference Doppler portions in the maximum range of 10 KHz cannot be amplified and remain ineffective.

As the block diagram according to FIG. 2 shows; the expense increases on the IF and LF side. The corresponding components in these frequency ranges are, however, less susceptible to interference and thus have a significantly less corrupting effect on the measurement results. In addition, they are smaller and thus more easily integrated.

What is claimed is:

1. A method of generating and analyzing a radar pulse, the method comprising:

connecting a continuous signal of a radio frequency source to an antenna via at least one mixer;

generating the radar pulse by placing each of the at least one mixer briefly into a state of low throughput loss;

while each of the at least one mixer is in the state of low throughput loss, transmitting the radar pulse via each of the at least one mixer and via the antenna; and after the radar pulse is generated and transmitted, switching each of the at least one mixer via which the radar pulse is transmitted from the state of low throughput loss to a receive mode, each of the switched mixers mixing a received signal with the continuous signal of the radio frequency source to form a mixed signal in order to analyze the mixed signal, the received signal being a reflected radar pulse.

2. The method according claim 1, further comprising:

amplifying the mixed signal at a high bandwidth; and sampling the mixed signal.

3. The method according to claim 2, wherein:

the mixed signal is sampled by applying a very short sampling pulse to a broadband sampler, a time of which corresponding to a selected distance cell.

4. The method according to claim 1, wherein:

the method is used for a short-range pulse radar application in a vehicle.

5. A method of generating and analyzing a radar pulse, comprising:

connecting a continuous signal of a radio frequency source to an antenna via at least one mixer;

generating the radar pulse by placing the at least one mixer briefly into a state of low throughput loss;

transmitting the radar pulse; and after the radar pulse is generated and transmitted, switching the at least one mixer to a receive mode in order to analyze a mixed signal that a receive signal forms with the continuous signal of the radio frequency source;

wherein:

the at least one mixer includes two mixers, and the continuous signal of the radio frequency source and the receive signal are guided via the two mixers so that an inphase IF signal can be analyzed at a first one of the two mixers and so that a quadrature IF signal can be analyzed at a second one of the two mixers.

6. The method according to claim 5, further comprising:

amplifying and sampling the mixed signal separately for the inphase IF signal and the quadrature IF signal.

7. A method of generating and analyzing a radar pulse, comprising:

connecting a continuous signal of a radio frequency source to an antenna via at least one mixer;

generating the radar pulse by placing the at least one mixer briefly into a state of low throughput loss;

transmitting the radar pulse;

after the radar pulse is generated and transmitted, switching the at least one mixer to a receive mode in order to analyze a mixed signal that a receive signal forms with the continuous signal of the radio frequency source; and placing the at least one mixer into the state of low throughput loss, such that an intermediate frequency output of the at least one mixer can be connected to a power source.

8. A radar sensor for generating and analyzing a radar pulse, comprising:

an antenna;

at least one mixer;

a radio frequency source connected to the antenna via the at least one mixer;

at least one device for briefly placing each of the at least one mixer into a state of low throughput loss for generation of the radar pulse, the radar pulse being transmitted via each of the at least one mixer and via the antenna, when each of the at least one mixer is in the state of low throughput loss;

at least one device for switching each of the at least one mixer into a receive mode from the state of low throughput loss, wherein each of the at least one mixer is configured to mix a received signal with a signal of the radio frequency source to form a mixed output signal, when the mixer is in the receive mode, the received signal being a reflected radar pulse; and an analysis unit configured to analyze the mixed output signal.

9. The radar sensor according to claim 8, further comprising:

a broadband amplifier for analyzing a mixer output signal.

10. The radar sensor according to claim 9, wherein:

the broadband amplifier includes a suitably selected lower cutoff frequency, such that interference Doppler effects occur below the lower cutoff frequency.

11. The radar sensor according to claim 8, further comprising:

a broadband sampler configured to (i) analyze a mixer output signal and (ii) sample the mixer output signal with a short sampling pulse at a time corresponding to a selected distance cell.

12. The radar sensor according to claim 11, wherein:

the mixer output signal is amplified.

13. The radar sensor according to claim 8, wherein:

the radar sensor is used for short-range pulse radar applications in vehicles.

14. A radar sensor for generating and analyzing a radar pulse, comprising:

an antenna;

at least one mixer;

a radio frequency source connected to the antenna via the at least one mixer;

a device for briefly placing the at least one mixer into a state of low throughput loss for generation of the radar pulse;

a device for switching the at least one mixer into a receive mode; and an analysis unit configured to analyze a mixed output signal that a signal of the radio frequency source forms with a receive signal;

wherein:

the at least one mixer includes two mixers that form an inphase IF signal and a quadrature IF signal.

15. The radar sensor according to claim 10, wherein:

the two mixers include balance mixers.

16. The radar sensor according to claim 15, wherein:

the two mixers are arranged as a rat-race hybrid.

17. The radar sensor according to claim 14, wherein:

separate receive and analysis channels are provided for the inphase and the quadrature IF signal.

18. A radar sensor for generating and analyzing a radar pulse, comprising:

an antenna;

at least one mixer;

a radio frequency source connected to the antenna via the at least one mixer;

a device for briefly placing the at least one mixer into a state of low throughput loss for generation of the radar pulse;

a device for switching the at least one mixer into a receive mode; and an analysis unit configured to analyze a mixed output signal that a signal of the radio frequency source forms with a receive signal;

wherein:

the device for briefly placing the at least one mixer into the state of low throughput loss is implemented by connecting an intermediate frequency output of the at least one mixer to a power source while the radar pulse is generated.

* * * * *